United States Patent [19]
Nagano

[11] 4,046,111
[45] Sept. 6, 1977

[54] COMBUSTION CHAMBER OF INTERNAL COMBUSTION ENGINE

[75] Inventor: Tetsuro Nagano, Susono, Japan

[73] Assignee: Toyota Jidosha Kogyo Kabushiki Kaisha, Toyota, Japan

[21] Appl. No.: 655,474

[22] Filed: Feb. 5, 1976

[30] Foreign Application Priority Data

Feb. 20, 1975  Japan .................................. 50-020330

[51] Int. Cl.$^2$ ............................................. F02B 3/00
[52] U.S. Cl. ........................... 123/32 SP; 123/191 SP; 123/32 C; 123/32 D
[58] Field of Search ............. 123/32 ST, 32 SP, 75 B, 123/191 S, 191 ST, 30 D, 32 C, 32 D

[56] References Cited

U.S. PATENT DOCUMENTS

| | | | |
|---|---|---|---|
| 2,419,096 | 4/1947 | Stickney | 123/32 SP |
| 2,735,413 | 2/1956 | Meyer et al. | 123/32 SP |
| 3,063,434 | 11/1962 | Haas | 123/32 SP |
| 3,807,369 | 4/1974 | Yagi | 123/32 SP |
| 3,970,053 | 7/1976 | Goodacre | 123/32 SP |

*Primary Examiner*—Carroll B. Dority, Jr.
*Assistant Examiner*—Ronald B. Cox
*Attorney, Agent, or Firm*—Blanchard, Flynn, Thiel, Boutell & Tanis

[57] ABSTRACT

A combustion chamber structure for an internal combustion engine, which combustion chamber structure includes a main combustion chamber and a separate auxiliary combustion chamber. The main combustion chamber is supplied solely with air by a conventional intake valve. A passage interconnects the main and auxiliary combustion chambers for permitting air to flow into the auxiliary combustion chamber during the compression stroke of the piston. The auxiliary combustion chamber has a fuel-injection nozzle and a spark ignition plug associated therewith. An obstacle, such as a spherical or cylindrical member, is positioned within but spaced from the sidewall of the auxiliary combustion chamber, whereby a circular flow pattern is created within the auxiliary combustion chamber which improves the fuel atomization and the uniformity of the fuel-air mixture. The spark plug is positioned adjacent the passage which interconnects the chambers so as to result in proper stratified combustion within the main chamber, while also minimizing noise.

9 Claims, 8 Drawing Figures

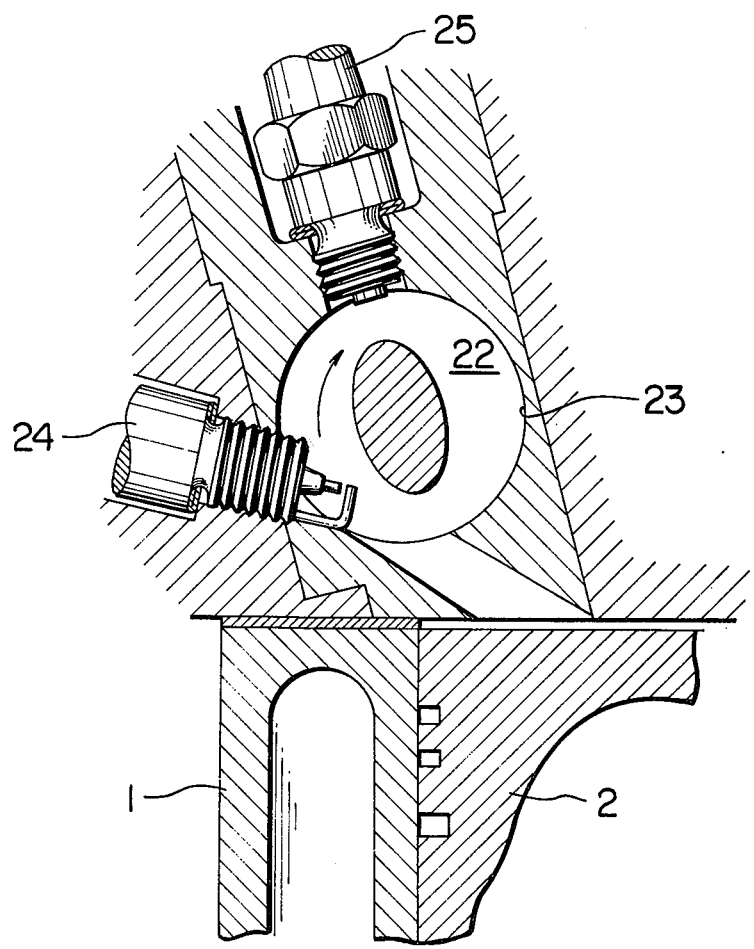

COMBUSTION CHAMBER OF INTERNAL COMBUSTION ENGINE

FIELD OF THE INVENTION

The present invention relates to a combustion chamber structure for an internal combustion engine and, in particular, to a combustion chamber structure of the type in which air alone is introduced into a main combustion chamber through an intake valve while fuel is injected into an auxiliary combustion chamber where it is ignited by a spark ignition device.

BACKGROUND OF THE INVENTION

Various methods are known for reducing toxic components, such as hydrocarbons, carbon monoxide and nitrogen oxides, contained in the exhaust gases discharged from an internal combustion engine. One such method comprises injecting the fuel into an auxiliary combustion chamber, wherein it is ignited by a spark ignition plug and burns, whereupon the combustion flames in the auxiliary combustion chamber spread into a main combustion chamber which is supplied solely with air for re-combustion. In this method, known as the stratified combustion method, the air in the main combustion chamber is forced into the auxiliary combustion chamber during the compression stroke of the engine, whereupon a charge of fuel is injected into the auxiliary chamber to form a rich fuel-air mixture, which mixture is ignited in the auxiliary chamber by the spark ignition plug and burns. Thus, the production of nitrogen oxides can be minimized by burning a rich fuel-air mixture in the auxiliary combustion chamber, and a reduction in the hydrocarbon and carbon monoxide content can then be accomplished by means of the re-combustion in the main combustion chamber. Further, this re-combustion in the main combustion chamber is carried out in the presence of excess oxygen at relatively low temperatures, so that nitrogen oxides will not be produced in this process.

However, this stratified charge method has a disadvantage in that the air forced the main combustion chamber into the auxiliary combustion chamber during the compression stroke often causes a strong swirling of the gases inside the auxiliary combustion chamber. Thus, if the spark ignition plug is not installed in a proper position, the spark may be blown out. In addition, this method produces a large quantity of hydrocarbons during combustion because the fuel-air mixture in the auxiliary combustion chamber is not uniformly distributed.

In addition, it has been discovered that the location of the spark plug within the auxiliary combustion chamber significantly effects the combustion within the auxiliary chamber, and prevents a proper stratified combustion within the main chamber. For example, U.S. Pat. No. 2,735,413 discloses an engine utilizing an auxiliary chamber formed as an annulus and having a spark plug positioned deeply in the chamber so that it is spaced a substantial distance from the connecting passage which joins the auxiliary chamber to the main chamber. When the spark plug is positioned in this manner, substantial quantities of unburnt or incompletely burnt fuel-air mixture are blown out of the auxiliary combustion chamber into the main combustion chamber due to the substantial pressure increase resulting from the burning within the auxiliary chamber, which pressure increase is initiated adjacent the spark plug and then spreads toward the connecting passageway. This thus forces the unburned fuel-air mixture into the main combustion chamber, and results in an insufficient stratified combustion within the main combustion chamber, and also results in the production of undesired amounts of hydrocarbons and carbon monoxide. This relationship also produces undesired engine noise.

Thus, the object of this invention is to provide a combustion chamber structure for a spark-ignition type internal combustion engine, in which the above-described disadvantages are effectively overcome by positioning the spark plug in the auxiliary combustion chamber directly adjacent the end of the transfer passage which joins the auxiliary and main combustion chambers, whereby substantially all of the rich fuel-air mixture is burnt within the auxiliary combustion chamber and is not forced into the main combustion chamber, and wherein some of the burnt gases in the auxiliary combustion chamber are immediately blown out into the main combustion chamber to initiate combustion therein and thereby result in a less rapid pressure rise within the auxiliary combustion chamber coupled with a reduction in engine noise.

The present invention is characterized by positioning an obstacle, such as a substantially spherical or cylindrical obstacle, in the auxiliary combustion chamber of a combustion chamber structure which includes a main combustion chamber supplied solely with air through an intake valve, which auxiliary combustion chamber has a fuel injection nozzle and a spark ignition plug associated therewith, and a passage interconnecting the main and auxiliary combustion chambers. In the auxiliary combustion chamber according to this invention, the fuel-air mixture rotates around the obstacle, whereby the fuel is uniformly distributed in the mixture and thereby the ignitability of the mixture is increased. Further, by positioning the obstacle close to some portion of the interior wall of the auxiliary combustion chamber, the flow velocity around the obstacle can be varied so that blowing out of the spark arc can be prevented by installing the spark ignition plug at a location where the fuel-air mixture flows at low speed. As noted above, the spark plug is positioned directly adjacent the end of the transfer passage which connects the auxiliary and main combustion chambers.

BRIEF DESCRIPTION OF THE DRAWINGS

FIG. 6 illustrates still another embodiment of this invention.

DETAILED DESCRIPTION

Figure 1:
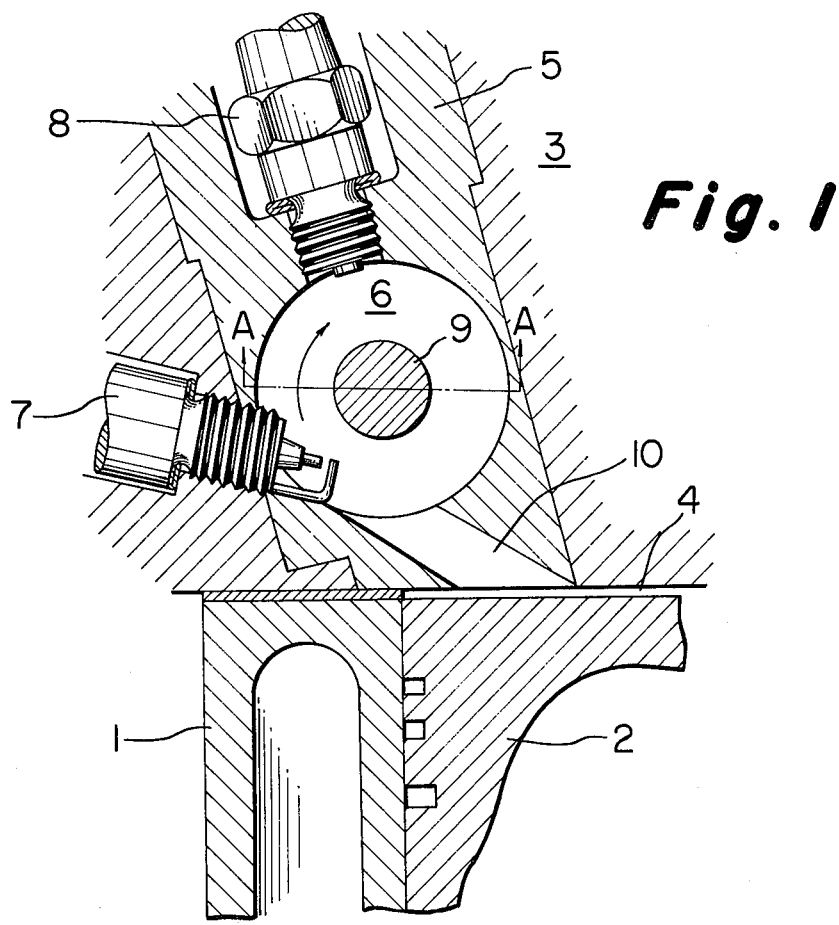
FIG. 1 is a cross-sectional view of a combustion chamber structure illustrating an embodiment of this invention.

First, the construction of the combustion chamber structure shown in FIG. 1 will be described. The combustion chamber structure includes a main combustion chamber 4 defined at the top of a cylinder 1, which chamber 4 is defined between a cylinder head 3 the top surface of a piston 2 which reciprocates with the cylinder bore. The main combustion chamber 4 is supplied solely with air through a conventional intake valve (not shown). The cylinder head 3 is fitted with a block 5 in which an auxiliary combustion chamber 6 is formed. A spark ignition plug 7 and a fuel injection nozzle 8 communicate with the inside of the auxiliary combustion chamber 6. The shape of the auxiliary combustion chamber 6 is preferably cylindrical as shown in FIG. 1A and thus resembles the swirl chamber of a diesel engine. However, chamber 6 may be substantially spherical in shape as shown in FIG. 1B or similar thereto. A smooth walled obstacle 9, which is spherical or cylindrical in shape, is placed substantially at the center of the chamber 6. Further, the main combustion chamber 4 and the auxiliary combustion chamber 6 are interconnected by a passage 10.

The following describes the operation of the combustion chamber structure described above.

Figure 2:
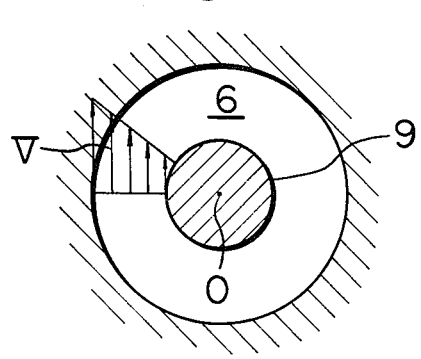
FIG. 2 shows the velocity distribution diagram of a circling flow in the auxiliary combustion chamber shown in FIG. 1.

Only air is supplied into the main combustion chamber 4 through an intake valve (not illustrated in the drawing). As the piston 2 moves toward its top dead center position during the compression stroke of the engine, the air is forced from the main combustion chamber 4 through the passage 10 into the auxiliary combustion chamber 6 in a direction substantially tangential to the interior wall of the auxiliary combustion chamber. The air forced into the auxiliary combustion chamber 6 thus rotates around the obstacle 9 as shown in FIG. 2. The velocity of this air flow becomes greater as the distance, in the direction of the radius, from the center 0 of the auxiliary combustion chamber 6 increases, as indicated by the arrow V in FIG. 2. A charge of fuel injected by the fuel injection nozzle 8 is atomized to a greater degree by this circling air flow. Also, the fuel becomes uniformly distributed throughout the auxiliary combustion chamber 6 owing to the velocity distribution which varies in the direction of the radius. In accordance with the present invention, injection of fuel into the auxiliary combustion chamber 6 is initiated by the fuel injection nozzle 8 during the intake stroke up to the beginning of the compression stroke, for example, about 90° before top dead center of the compression stroke, in order to insure the effective ignition of the fuel. The fuel-air mixture is then ignited by the spark ignition plug 7, and the resultant combustion flame is injected through the passage 10 into the main combustion chamber 4 for re-combustion. Because the velocity distribution occurs uniformly throughout the entire auxiliary combustion chamber 6, the fuel is distributed more uniformly than in an auxiliary combustion chamber without the obstacle 9, whereby the ignitability of the fuel-air mixture is increased and the amount of unburnt toxic components in the engine exhaust is decreased.

The above description relates to an embodiment in which the swirl of air in the auxiliary combustion chamber 6 is relatively uniform since the obstacle 9 is placed substantially at the center of the chamber 6. It is also possible to prevent with greater certainty the blow-out of the spark arc produced by the spark ignition plug and to improve the fuel atomization by varying the speed of circling air flow in the auxiliary combustion chamber 6. A second embodiment of such construction is illustrated in FIGS. 3 and 4.

Figure 3:
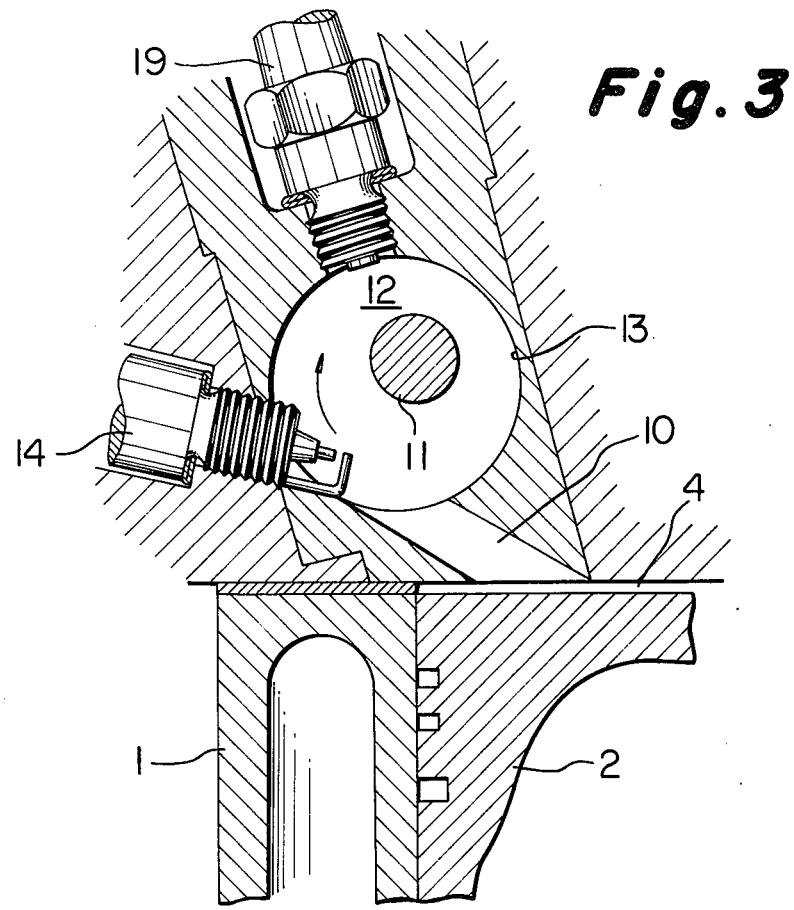
FIG. 3 is a cross-sectional view of a combustion chamber structure according to another embodiment of this invention.
Figure 4:
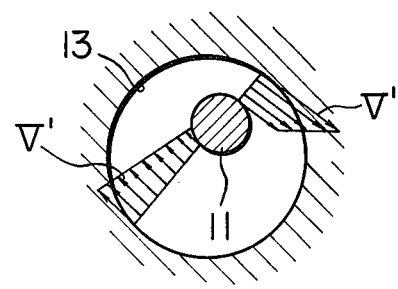
FIG. 4 is a velocity distribution diagram of a circling flow for the auxiliary combustion chamber shown in FIG. 3.

In the embodiment of FIGS. 3 and 4, the auxiliary combustion chamber 12 is of a cylindrical shape and is connected to the main chamber 4 by the passage 10. An obstacle 11, which may be cylindrical or spherical, is positioned within the chamber 12 but offset from the center thereof so that it is positioned close to a portion of the interior wall 13 of the auxiliary combustion chamber 12. The annulus formed between the obstacle 11 and the wall 13 is thus of non-uniform radial thickness around the circular extent thereof. A spark ignition plug 14 is positioned where the space between the obstacle 11 and the interior wall 13 is large, and a fuel injection nozzle 19 is positioned where the space between wall 13 and obstacle 11 is small.

In this auxiliary combustion chamber 12, the velocity distribution of the circling air therein is as indicated by the arrows V' in FIG. 4. That is, the velocity increases where the space between the obstacle 11 and the interior wall 13 is small, while the velocity decreases where the space is large. Since the spark ignition plug 14 is located where the flow velocity is low, blowout of the spark can be prevented. Also, the fuel atomization is improved since the high velocity air-flow impinges on the injected fuel.

Figure 1A:
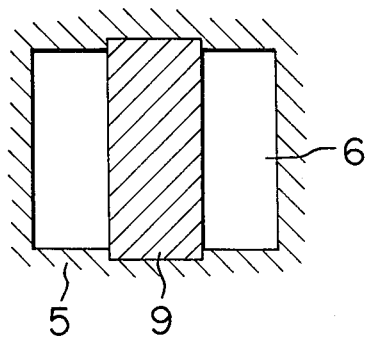
FIG. 1A is a sectional view along line A—A in FIG. 1.
Figure 1B:
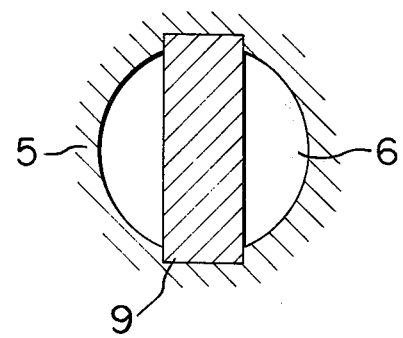
FIG. 1B is a view along line A—A in FIG. 1 but showing a variation.
Figure 5:
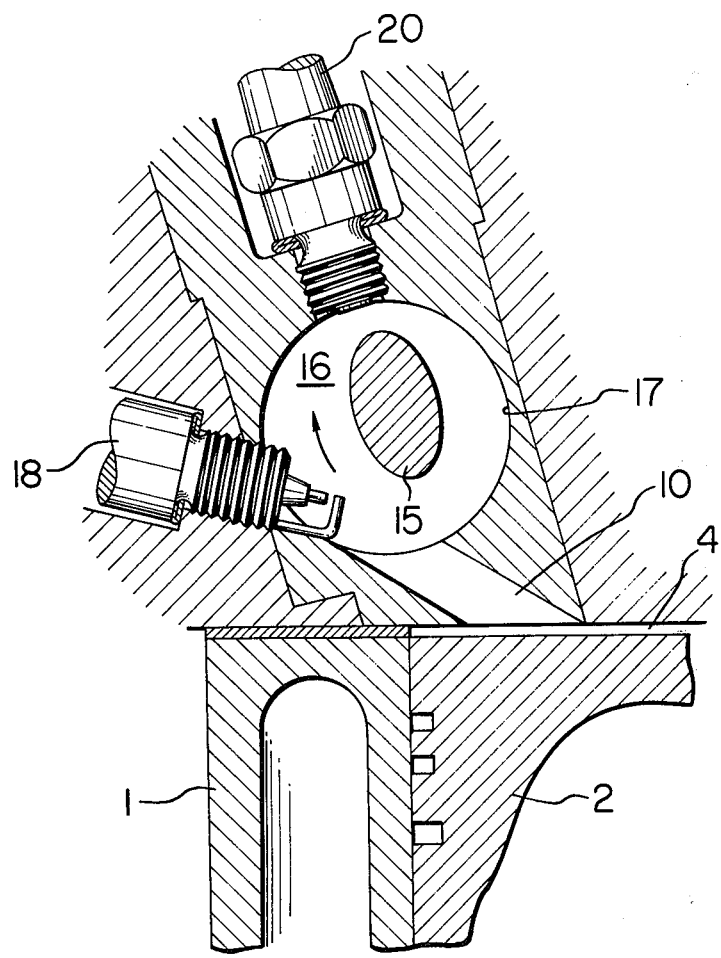
FIG. 5 is a cross-sectional view of a combustion chamber structure according to still another embodiment of this invention.

In the above-described embodiments of this invention, as shown in FIGS. 1 and 3, it has been found highly desirable to place the spark ignition plug near the passage 10 that interconnects the main and auxiliary combustion chambers, which positional relationship is illustrated in FIGS. 1, 3 and 5.

Particularly, when the spark plug is located in the auxiliary combustion chamber directly adjacent the end of the transfer passage 10, as shown in FIGS. 1, 3 and 5, the initial combustion within the auxiliary chamber occurs directly adjacent the transfer passage, whereupon this initial combustion propogates outwardly away from the spark plug into the auxiliary chamber and through the transfer passage into the main combustion chamber. This positional relationship of the spark plug thus prevents substantial quantities of unburnt, rich, fuel-air mixture from being forced or blown out of the auxiliary chamber into the main combustion chamber. Rather, all of the rich fuel-air mixture within the auxiliary chamber is effectively burnt within the auxiliary chamber so that a proper stratified combustion is achieved within the main combustion chamber. In addition, this location of the spark plug, and the resulting combustion which is achieved in the auxiliary combustion chamber, results in a slower pressure rise within the auxiliary chamber due to the immediate blowing out of some of the burnt gases from the auxiliary combustion chamber into the main combustion chamber. This has also been observed to substantially minimize engine noise.

Also, the auxiliary combustion chamber may be formed integrally in the cylinder head if desired.

The shape of the obstacle is not limited to spherical or cylindrical, since any preferably smooth-walled obstacle which is approximately spherical or cylindrical in shape may serve the purpose so long as it can produce a swirl having a region where the circling air flows at a low velocity and a region where the velocity is high. For example, FIG. 5 illustrates an ellipsoid or an ellipsoidal column employed as obstacle.

In the modification shown in FIG. 5, an ellipsoid or an ellipsoidal obstacle 15 is positioned within the cylindrical auxiliary combustion chamber 16. The center of the obstacle 15 is offset from the center of the chamber 16 so that a portion of the obstacle is thus positioned close to a portion of the interior wall 17 of the auxiliary combustion chamber 16. A spark ignition plug 18 is positioned where the space between the obstacle 15 and the interior wall is substantially its largest, and the fuel injector nozzle 20 is positioned where this space is substantially its smallest. In accordance with this construction, substantially the same effect can be obtained as in the embodiment of FIG. 3.

As described above, this invention accelerates the atomization of the fuel and improves the uniformity of fuel distribution in the auxiliary combustion chamber of the stratified-charge type engine, in which air alone is introduced into the main combustion chamber, while the fuel is injected into the auxiliary combustion chamber for forming a rich fuel-air mixture in the auxiliary combustion chamber, which mixture is ignited and combusted in the auxiliary combustion chamber due to the positioning of the spark plug directly adjacent the connecting passage. By this means, the production of hydrocarbons in the auxiliary combustion chamber can be decreased, and the ignitability of the mixture is improved.

In the modification shown in FIG. 6, an ellipsoidal obstacle or ellipsoidal column 21 is positioned within the cylindrical auxiliary combustion chamber 22. The center of the obstacle 21 is positioned at the center of the auxiliary combustion chamber 22 wherein the distance between the interior wall 23 of the auxiliary combustion chamber 22 and the outer surface of the obstacle 21 varies along the circumference of the obstacle. The obstacle is oriented such that a spark ignition plug 24, which is positioned near the connecting passage 10, is positioned where said distance is large and a fuel injection nozzle 25 is preferably positioned where said distance is small. In accordance with this construction, substantially the same effect can be obtained as in the embodiments of FIGS. 3 and 5 even though the center of obstacle 21 is positioned at the center of the auxiliary combustion chamber 22. Furthermore, in accordance with this construction, it is easier to manufacture the ellipsoidal obstacle than that in the embodiment of FIG. 5 because the obstacle 21 is positioned at the center of the auxiliary combustion chamber 22.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a combustion chamber structure for an internal combustion engine, comprising a main combustion chamber supplied solely with air, an auxiliary combustion chamber having a fuel injection nozzle and a spark ignition device communicating therewith, a transfer passage which interconnects said main and auxiliary combustion chambers and which is substantially tangential to said auxiliary combustion chamber at its point of communication, and an obstacle positioned in said auxiliary combustion chamber so that said auxiliary combustion chamber is shaped as an annulus, said obstacle having a smooth and continuous rounded outer surface, the improvement wherein said spark ignition device communicates directly with said auxiliary combustion chamber, wherein the distance between the interior wall of the auxiliary combustion chamber and the outer surface of the obstacle varies along the periphery of the obstacle, and wherein said spark ignition device is positioned where said distance is large.

2. A combustion chamber structure according to claim 1, wherein said spark ignition device is positioned for communication with said auxiliary combustion chamber at a location disposed in the vicinity of the point of communication with said transfer passage.

3. A combustion chamber structure according to claim 1, wherein said fuel injection nozzle is positioned where said distance is small.

4. A combustion chamber structure according to claim 3, wherein said obstacle is substantially spherical or cylindrical and is offset from the center of the auxiliary combustion chamber so that it is close to one side of the interior wall of said auxiliary combustion chamber.

5. A combustion chamber structure according to claim 3, wherein the shape of said obstacle is substantially ellipsoid or ellipsoidal columnar.

6. A combustion chamber structure according to claim 5, wherein the center of said obstacle is positioned at the center of the auxiliary combustion chamber.

7. A combustion chamber structure according to claim 3, wherein said auxiliary combustion chamber is substantially cylindrical in shape, said obstacle having a cross section substantially less than the cross section of said auxiliary combustion chamber and having a relatively smooth outer peripheral surface which encircles the obstacle and is spaced from the surrounding interior wall of the combustion chamber so as to define a flow path shaped as an annulus between said obstacle and the interior wall of the auxiliary combustion chamber.

8. A combustion chamber structure according to claim 3, wherein said spark ignition device is positioned for communication with said auxiliary combustion chamber at a location disposed in the vicinity of the point of communication with said passage.

9. In a combustion chamber structure for an internal combustion engine, comprising a main combustion chamber supplied solely with air, an auxiliary combustion chamber having a fuel injection nozzle and a spark ignition device communicating therewith, a transfer passage which interconnects said main and auxiliary combustion chambers and which is substantially tangential to said auxiliary combustion chamber at its point of communication, and an obstacle positioned in said auxiliary combustion chamber so that said auxiliary combustion chamber is shaped as an annulus, said obstacle having a smooth and continuous rounded outer surface, the improvement wherein said spark ignition device communicates directly with said auxiliary combustion chamber, wherein the distance between the interior wall of the auxiliary combustion chamber and the outer surface of the obstacle varies along the periphery of the obstacle, and wherein said fuel injection nozzle is positioned where said distance is small.

* * * * *